United States Patent [19]
Leung

[11] Patent Number: 5,799,166
[45] Date of Patent: Aug. 25, 1998

[54] WINDOW DELTA FROM CURRENT WINDOW FOR FAST REGISTER FILE ADDRESS DEPENDENCY CHECKING

[75] Inventor: Arthur T. Leung, Sunnyvale, Calif.

[73] Assignee: Sun Microsystems, Inc., Palo Alto, Calif.

[21] Appl. No.: 664,479

[22] Filed: Jun. 17, 1996

[51] Int. Cl.$^6$ ............................................. G06F 9/34
[52] U.S. Cl. ................................... 395/392; 395/376
[58] Field of Search ............................. 395/392, 393, 395/394, 395, 376

[56] References Cited

U.S. PATENT DOCUMENTS

| | | | |
|---|---|---|---|
| 5,233,691 | 8/1993 | Ando et al. | 395/569 |
| 5,276,820 | 1/1994 | Ikenaga et al. | 395/569 |
| 5,581,721 | 12/1996 | Wada et al. | 395/376 |
| 5,640,588 | 6/1997 | Vegesna et al. | 395/392 |

*Primary Examiner*—Richard L. Ellis
*Attorney, Agent, or Firm*—Townsend and Townsend and Crew LLP

[57] ABSTRACT

A simplified comparison of register designations by using a window delta which indicates how much the window of an instruction differs from the current window register designation. Where registers are shared, the windows will either be the same or differ by one. Thus, a single bit can be used to indicate the window delta, and in combination with the logical register address, can be used to quickly determine whether there is a register match between instructions.

18 Claims, 5 Drawing Sheets

| | ADDR_HI | SAVE (INC) | RESTORE (DBC) | | NBW ADDR HI | WINDOW Δ |
|---|---|---|---|---|---|---|
| GLOBAL | 00 | X | X | | 00 | 0 |
| LOCAL | 10 | X | X | | 10 | 1 |
| | 01 | 1 | 0 | | 11 | 0 |
| OUTPUT | 01 | 0 | 1 | | 01 | 1 |
| | 01 | 0 | 0 | | 01 | 0 |
| | 11 | 1 | 0 | | 11 | 1 |
| INPUT | 11 | 0 | 1 | | 01 | 0 |
| | 11 | 0 | 0 | | 11 | 0 |

| | ADDR_HI | SAVE (INC) | RESTORE (DBC) | | NBW ADDR HI | WINDOW Δ |
|---|---|---|---|---|---|---|
| GLOBAL | 00 | X | X | | 00 | 0 |
| LOCAL | 10 | X | X | | 10 | 1 |
| | 01 | 1 | 0 | | 11 | 0 |
| OUTPUT | 01 | 0 | 1 | | 01 | 1 |
| | 01 | 0 | 0 | | 01 | 0 |
| | 11 | 1 | 0 | | 11 | 1 |
| INPUT | 11 | 0 | 1 | | 01 | 0 |
| | 11 | 0 | 0 | | 11 | 0 |

WINDOW DELTA FROM CURRENT WINDOW FOR FAST REGISTER FILE ADDRESS DEPENDENCY CHECKING

BACKGROUND OF THE INVENTION

The present invention relates to register dependency checking in a microprocessor, and in particular to a microprocessor using window registers.

In modern superscalar microprocessors, a plurality of pipelines are provided to process instructions in parallel, with each pipeline having multiple stages. Typically, multiple pipelines are connected to a single register file. When an instruction has completed operating on data, the result can be written to the central register file. In order to speed up operation of the microprocessor, it is typical to include data-bypassing logic in order for a subsequent instruction to access the result of a previous instruction before it is written to the central register file. Detecting that an instruction requires data that is not yet written can be a critical long path in a multiscalar design. Accordingly, it is important to shorten that path to achieve high frequency operation.

This task is made even more difficult for designs that support large register file arrays and have overlapping windows of registers. A large address space requires long addresses, with the corresponding large number of bits to compare. Register windows are a technique used to allow overlapping windows such that a group of registers from the old window can be designated as output registers, with the same registers being designated as input registers in the new window. The input register values are thus accessible more readily without requiring a transfer from an output to an input.

However, the use of window designations for the registers complicates the determination of whether a newest instruction is addressing the same register, since both a logical register address and a window designation must be compared. Alternately, a translation back into a physical register address can be done for the comparison.

SUMMARY OF THE INVENTION

The present invention simplifies comparison of register designations by using a window delta which indicates how much the window of an instruction differs from the current window register designation. The invention recognizes that, where registers are shared, the windows will either be the same or differ by one. Thus, a single bit can be used to indicate the window delta, and in combination with the logical register address, can be used to quickly determine whether there is a register match between instructions. This allows a speedy determination of whether a stage can be bypassed.

Preferably, each stage of a pipeline where register writing can be bypassed includes circuitry for comparing a new instruction's destination register address with the logical destination register address in that stage. If there is a match, and the window delta is zero, the same register is addressed. If there is not an address match, or if the window delta is one, different registers are addressed and there is no conflict. This can be determined with simple comparison logic.

Update logic is also provided to correct the window delta for save and restore instructions which change the current window pointer. The window delta is changed appropriately depending upon whether the register designation is for an input, local, or output register.

For fuller understanding of the nature and advantages of the invention, reference should be made to the ensuing detailed description in conjunction with the accompanying drawings.

DESCRIPTION OF THE PREFERRED EMBODIMENT

Figure 1:
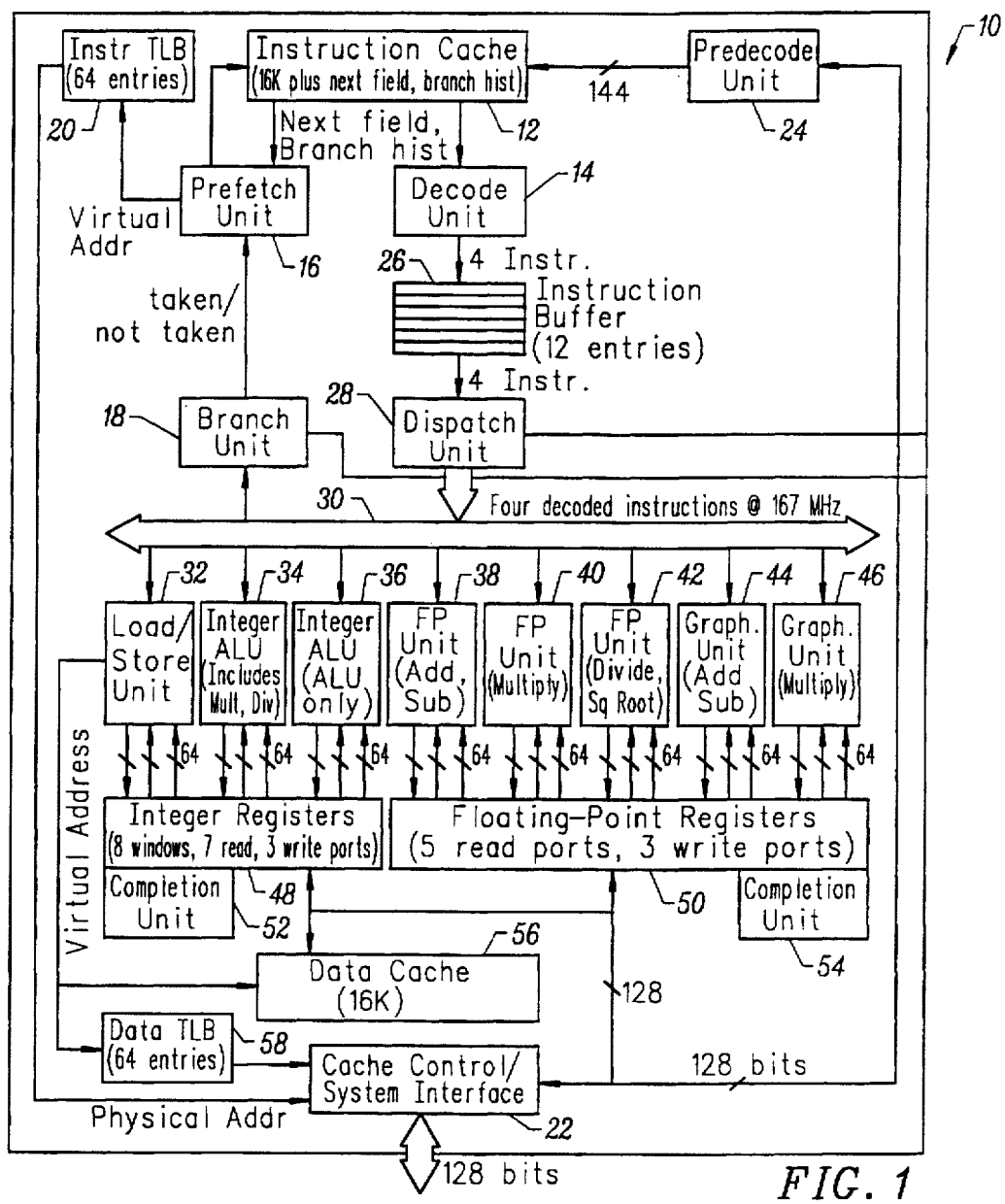
FIG. 1 is a block diagram of a microprocessor into which the present invention can be incorporated.

FIG. 1 is a block diagram of an UltraSparc™ microprocessor 10, modified to incorporate the present invention. An instruction cache 12 provides instructions to a decode unit 14. The instruction cache can receive its instructions from a prefetch unit 16, which either receives instructions from branch unit 18 or provides a virtual address to an instruction TLB (translation look-aside buffer) 20, which then causes the instructions to be fetched from an off-chip cache through a cache control/system interface 22. The instructions from the off-chip cache are provided to a pre-decode unit 24 to provide certain information, such as whether it is a branch instruction, to instruction cache 12.

Instructions from decode unit 14 are provided to an instruction buffer 26, where they are accessed by dispatch unit 28. Dispatch unit 28 will provide up to four decoded instructions at a time along a bus 30, each instruction being provided to one of eight functional units 32–46. The dispatch unit will dispatch up to four such instructions each cycle, subject to checking for data dependencies and availability of the proper functional unit.

The first three functional units, the load/store unit 32 and the two integer ALU units 34 and 36, share a set of integer registers 48. Floating-point registers 50 are shared by floating point units 38, 40 and 42 and graphical units 44 and 46. Each of the integer and floating point functional unit groups have a corresponding completion unit, 52 and 54, respectively. The microprocessor also includes an on-chip data cache 56 and a data TLB 58.

Figure 2:
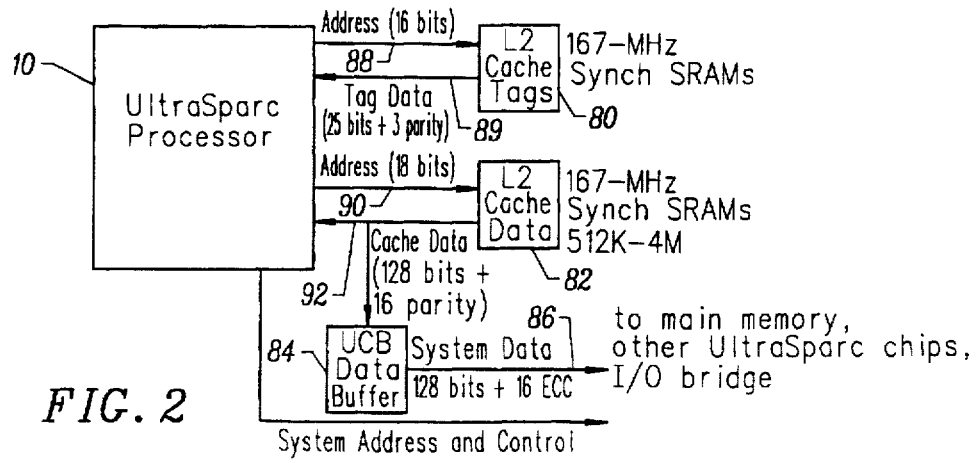
FIG. 2 is a block diagram of a portion of a computer system including the microprocessor of FIG. 1.

FIG. 2 is a block diagram of a chipset including processor 10 of FIG. 1. Also shown are L2 cache tag memory 80, and L2 cache data memory 82. In addition, a data buffer 84 for connecting to the system data bus 86 is shown. In the example shown, a 16-bit address bus 88 connects between processor 10 and tag memory 80, with the tag data being provided on a 28-bit tag data bus 89. An 18-bit address bus 90 connects to the data cache 82, with a 14 bit data bus 92 to read or write cache data.

Figure 3:
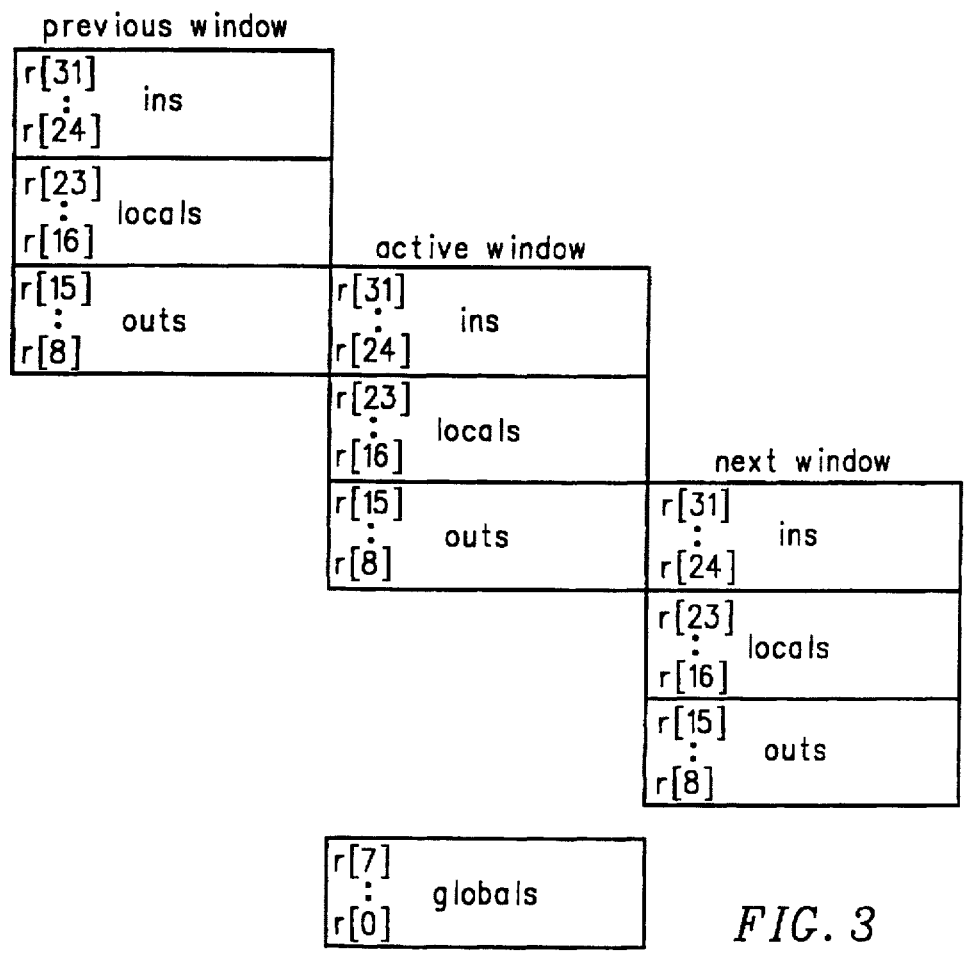
FIG. 3 is a diagram illustrating the register windows for three adjacent windows.

In one embodiment, an integer register file 48 with overlapping register windows is used as shown in FIG. 1. The register designations are illustrated in FIG. 3, the registers R [0] through R [7] being designated as global registers. The remaining registers are also associated with a window of registers, with each program corresponding to a particular window. FIG. 3 shows an active window along with a previous window and next window. The register designation in each window are the logical register designations. In this way, each program can always know that registers R [8]–R [15] are output registers regardless of which window it is assigned. In the microprocessor itself, these can be mapped to physical registers using the window pointer. The microprocessor knows that the output registers of the previous window are the same physical registers as the input registers of the active window as shown in FIG. 3. A current window pointer (CWP) is maintained to allow the microprocessor to know the active window for instructions being issued. As instructions propagate through the pipeline, a 3-bit window designation is typically maintained in the prior art with each instruction, along with its 5-bit logical register designation.

Figure 4:
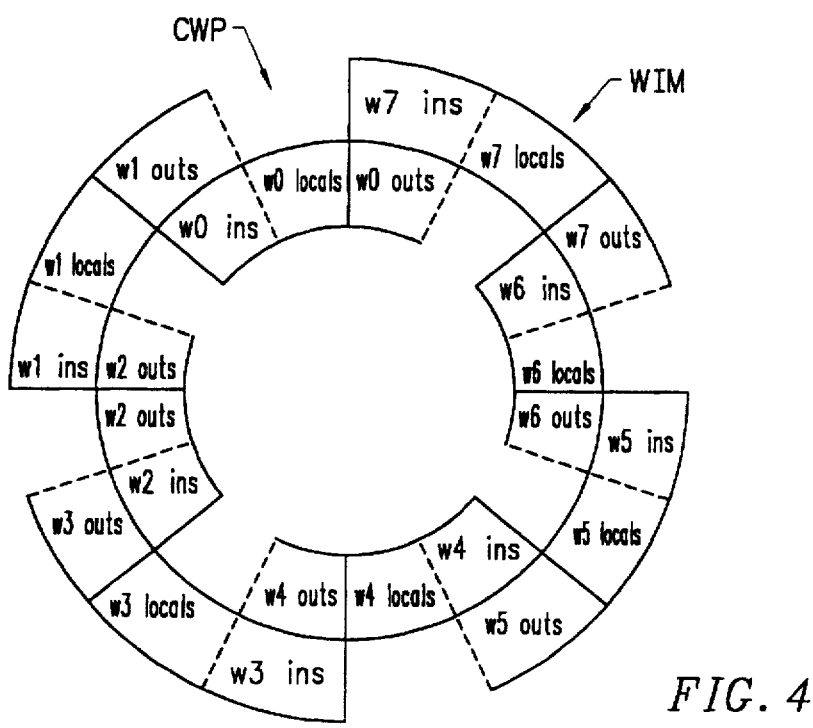
FIG. 4 is a diagram illustrating multiple windows of registers.

FIG. 4 illustrates the overlap of eight different windows, shown in circular fashion. In the embodiment of FIG. 1, up to eight windows can be supported by the microprocessor hardware in the pipeline, allowing extended nesting of routines.

The inventor of the present invention recognized, as can be seen from FIGS. 3 and 4, that where a physical register is shared by two procedures due to overlapping windows, the difference in the windows will be one at the most. Thus, for checking data dependency, it only needs to be determined whether the data is being written to the same window or a window which is off by one bit.

In the prior art systems in which a 5-bit logical register address in combination with a 3-bit window address is used, a determination of whether this same physical register as referenced can be complicated and time consuming. One approach is to convert the 5-bit logical and 3-bit window address into a physical address for both the outstanding instruction and the new instruction being issued. This allows a direct comparison at the physical address level. The present invention, on the other hand, simply compares the logical addresses and a 1-bit window delta. If the logical addresses are identical, and the window delta is zero, the same register is being addressed. If the window delta is one, on the other hand, a different register will be addressed. And, if the register address is different, a different register is addressed.

Figure 5:
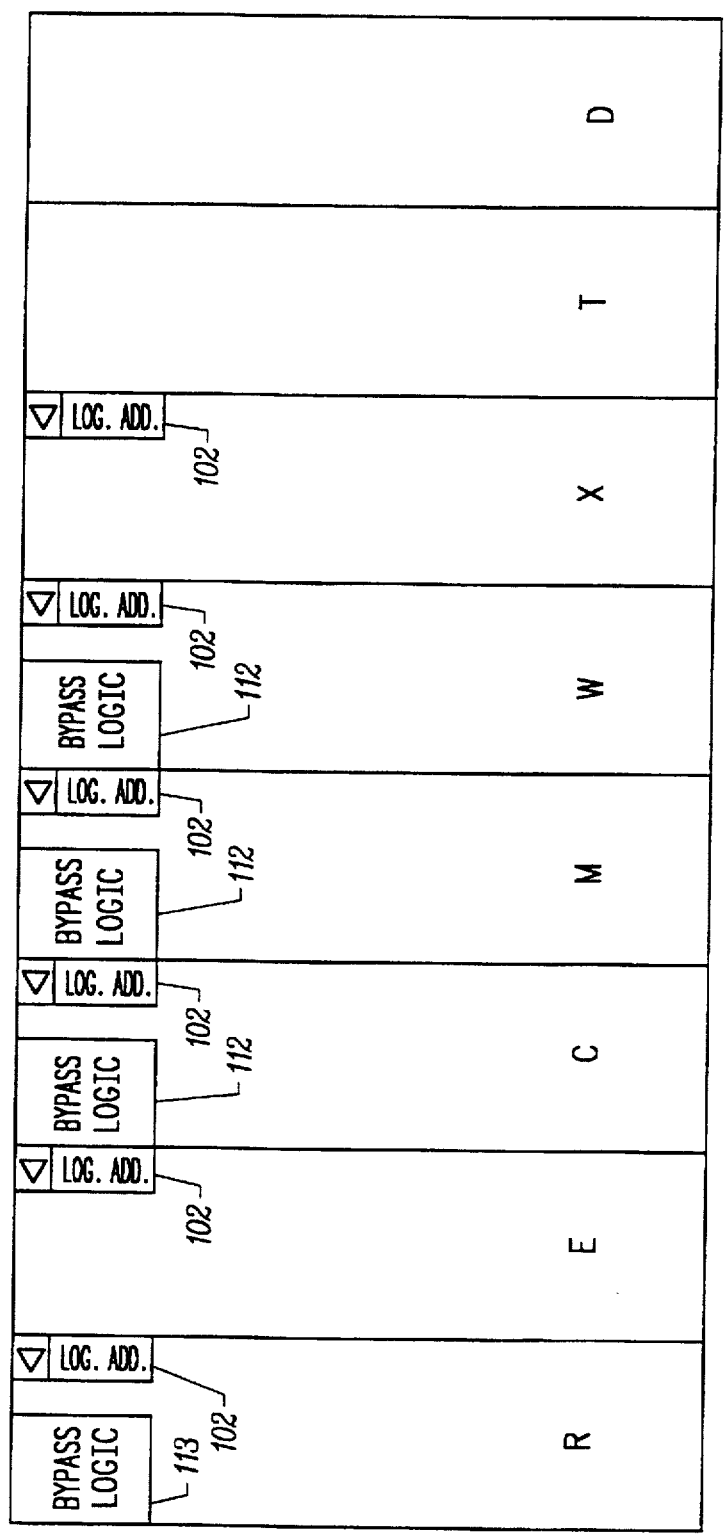
FIG. 5 is a block diagram illustrating an instruction pipeline including the bypass logic and window delta storage according to the present invention.

FIG. 5 illustrates an implementation of the present invention with a single example pipeline. A pipeline 100 is shown with eight stages, R, E, C, M, W, X, T, D. Associated with a number of the stages is an entry 102 storing the logical address of the destination register in a field 108 and the window delta in a field 110. A current window pointer register 109 stores the current window of registers being used by new instructions entering the pipeline. In the first stage and other stages where a write can occur and be available for bypassing (stages C, M and W in the embodiment shown, later stages have already written to the register file), bypass logic 112, 113 is coupled to the stage. The bypass logic allows a result to be obtained before it is written to the integer register file, thus bypassing the write to the register file and speeding up the operation of the processor. The bypass logic thus needs to determine whether there is a match for the register being bypassed.

Figure 6:
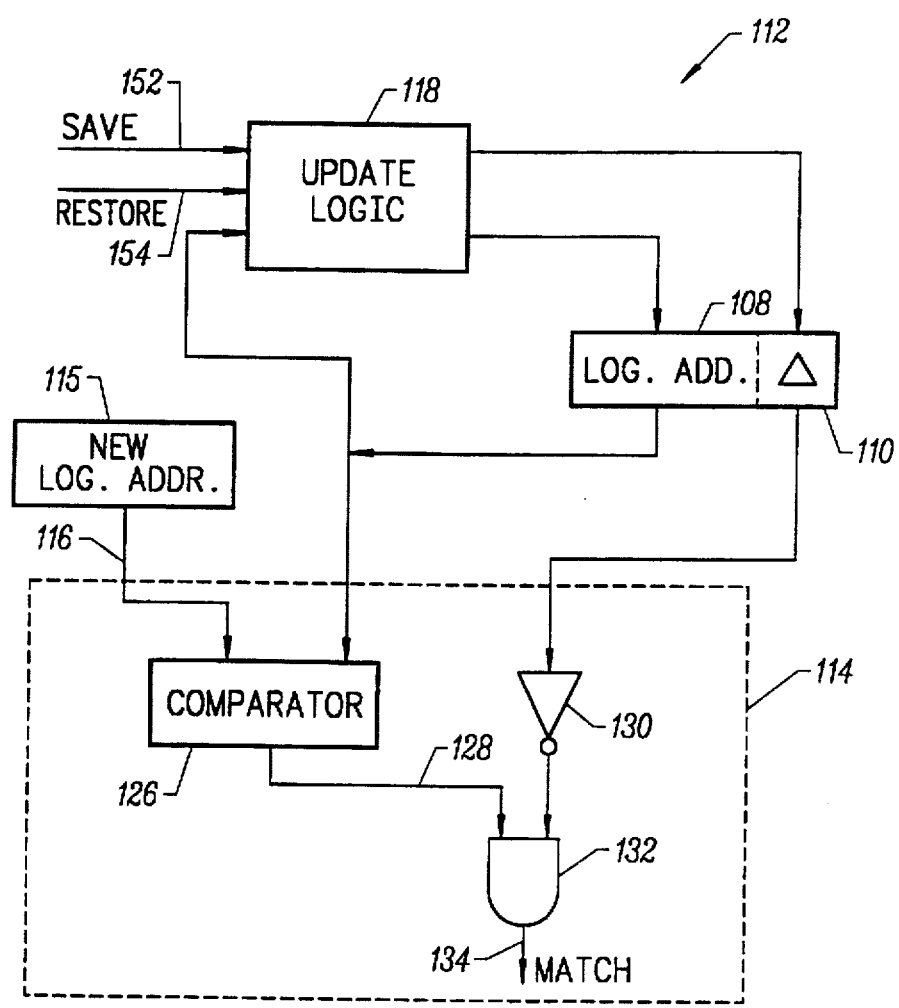
FIG. 6 is a block diagram of an embodiment of the bypass logic of FIG. 5.

FIG. 6 is a diagram of one embodiment of a portion of bypass logic 112 according to the present invention. Comparison logic 114 determines whether the logical address for the destination register of a new instruction in register 115 provided on input line 116 (corresponding to a current window) matches a logical address of a destination register in field 108 for that stage, in a window indicated by a window delta 110. Update logic 118 is provided to update the window delta whenever the current window pointer changes.

Comparison logic unit 114 includes a comparator 126 for comparing logical addresses. If there is a match, a one will be provided on output line 128. A window delta of zero, indicating the same window, will be inverted to a one by invertor 130, with its output being provided to an AND gate 132 along with line 128, providing a match indication on line 134 if both have a one.

Update logic 118 will update the information in fields 108 and 110 of the outstanding instruction FIFO when a save or restore instruction occurs which changes the current window pointer. The save and restore instructions cause inputs 152 or 154 to update logic unit 118 to be activated. A save instruction increments into the next window, while a restore instruction decrements into the previous window. With respect to logical window designations, global registers and local registers do not need to change. However, a change of windows causes the input window's registers to become output window registers, and vice versa. Accordingly, update logic unit 118 will modify the logical address and the window delta as indicated in the table set forth in FIG. 7.

As can be seen, the window delta eliminates the need to know the exact window an instruction was in when issued, and eliminates the need to convert to a physical address for comparison, thus speeding up the determination of whether a bypass can be done. In addition, very short addresses for comparison are needed, and a single bit (the window delta) allows a determination of whether it is in the same address space. This implementation can be done for multiple save instructions changing across multiple windows, and for multiple restore instructions, as well as for combinations of save and restore.

Figures 7, 8:
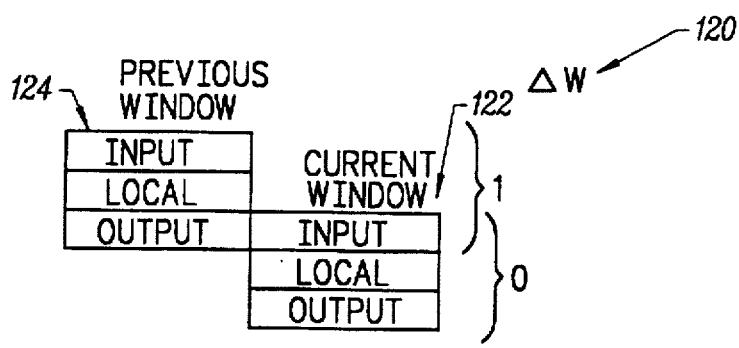
FIG. 7 is a table illustrating the logical address and window delta updates for save and restore operations.
FIG. 8 is an illustration of the window delta for two adjacent windows of registers.

FIG. 8 illustrates the designation of the window delta 120 for a current window 122 compared to a previous window 124. A window delta of one indicates the previous window, while a window delta of zero indicates the current window.

As will be understood by those with skill in the art, the present invention may be embodied in other specific forms without departing from the spirit or essential characteristics thereof. For example, a 2-bit window delta could be used for another embodiment. Accordingly, the foregoing description is intended to be illustrative, but not limiting, of the scope of the invention which is set forth in the following claims.

What is claimed is:

1. A microprocessor comprising:

at least one instruction execution pipeline having a plurality of stages;

a windowed register file coupled to said pipeline;

an instruction dispatch unit;

a current window pointer register configured to store a current window of registers associated with dispatched instructions;

a first memory location storing a logical register designation for at least one of said stages; and a second memory location storing a window delta associated with said first memory location, said window delta indicating a variation from a window designation in said current window register.

2. The microprocessor of claim 1 wherein said window delta is a single bit.

3. The microprocessor of claim 1 further comprising bypass logic coupled to at least one of said stages, said bypass logic including comparison logic coupled to said first and second memory locations and an input logical address.

4. The microprocessor of claim 1 further comprising update logic coupled to said first and second memory locations.

5. The microprocessor of claim 4 wherein said logical register designations include input, local, and output registers, and said dispatched instructions include a save instruction which increments said current window register, and a restore instruction which decrements said current window register.

6. The microprocessor of claim 5 wherein said update logic is configured to modify said first memory location, in response to a save instruction, to maintain an input register as an input register and set a corresponding window delta to one, and rename an output register as an input register and set a corresponding window delta to zero.

7. The microprocessor of claim 5 wherein said update logic is configured to modify said first memory location, in response to a restore instruction, to rename an input register as an output register and set a corresponding window delta to zero, and maintain an output register as an input register and set a corresponding window delta to one.

8. A microprocessor comprising:

at least one instruction execution pipeline having a plurality of stages;

a windowed register file coupled to said pipeline;

an instruction dispatch unit;

a current window pointer register configured to store a current window of registers associated with dispatched instructions;

a first memory location storing a logical register designation for at least one of said stages;

a second memory location storing a single bit window delta associated with said first memory location, said window delta indicating a variation from a window designation in said current window register;

bypass logic coupled to at least one of said stages, said bypass logic including comparison logic coupled to said first and second memory locations and an input logical address;

update logic coupled to said first and second memory locations;

wherein said logical register designations include input, local, and output registers, and said dispatched instructions include a save instruction which increments said current window pointer register, and a restore instruction which decrements said current window pointer register;

wherein said update logic is configured to modify said first memory location, in response to a save instruction, to maintain an input register as an input register and set a corresponding window delta to one, and rename an output register as an input register and set a corresponding window delta to zero; and wherein said update logic is configured to modify said first memory location, in response to a restore instruction, to rename an input register as an output register and set a corresponding window delta to zero, and maintain an output register as an input register and set a corresponding window delta to one.

9. A computer system comprising:

a main memory;

a bus coupled to said main memory;

a microprocessor coupled to said bus, said microprocessor including at least one instruction execution pipeline having a plurality of stages;

a windowed register file coupled to said pipeline;

an instruction dispatch unit;

a current window pointer register configured to store a current window of registers associated with dispatched instructions;

a first memory location storing a logical register designation for at least one of said stages; and a second memory location storing a window delta associated with said first memory location, said window delta indicating a variation from a window designation in said current window pointer register.

10. The microprocessor of claim 9 wherein said window delta is a single bit.

11. The microprocessor of claim 9 further comprising bypass logic coupled to at least one of said stages, said bypass logic including comparison logic coupled to said first and second memory locations and an input logical address.

12. The microprocessor of claim 9 further comprising update logic coupled to said first and second memory locations.

13. A method for operating a microprocessor having at least one instruction execution pipeline having a plurality of stages and a register file coupled to said pipeline, comprising the steps of:

storing a current window of registers associated with dispatched instructions;

storing a logical register designation for at least one of said stages; and storing a window delta associated with said logical register designation, said window delta indicating a variation from said current window of registers.

14. The method of claim 13 wherein said window delta is a single bit.

15. The method of claim 13 further comprising the step of bypassing a register write from at least one of said stages based on comparing said logical register designation with an input logical address and a state of said window delta.

16. The method of claim 13 further comprising the steps of:

designating input, local, and output registers; and dispatching instructions including a save instruction which increments said current window of registers, and a restore instruction which decrements said current window of registers.

17. The method of claim 16 further comprising the steps of, in response to a save instruction:

maintaining an input register as an input register and setting a corresponding window delta to one; and renaming an output register as an input register and setting a corresponding window delta to zero.

18. The method of claim 16 further comprising the steps of, in response to a restore instruction:

renaming an input register as an output register and setting a corresponding window delta to zero; and renaming an output register as an input register and incrementing a corresponding window delta.

* * * * *